Nov. 26, 1963 E. R. BACKOFEN 3,111,856
COMBINED GUIDE MEANS

Original Filed Feb. 7, 1958 3 Sheets-Sheet 1

INVENTOR.
ELMER R. BACKOFEN
BY
ATTY.

Nov. 26, 1963  E. R. BACKOFEN  3,111,856
COMBINED GUIDE MEANS
Original Filed Feb. 7, 1958  3 Sheets-Sheet 2

INVENTOR.
ELMER R. BACKOFEN
BY J. P. Wiessler
ATTY.

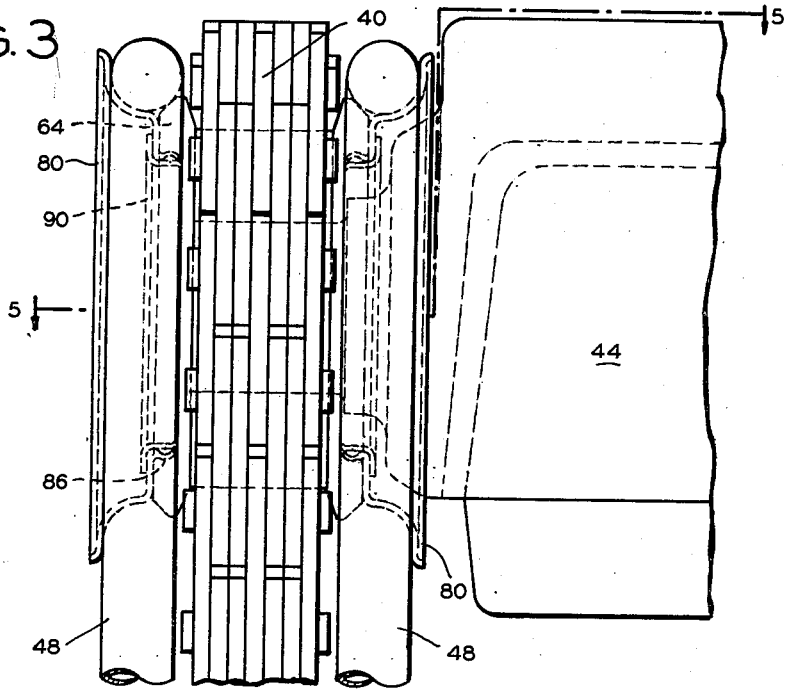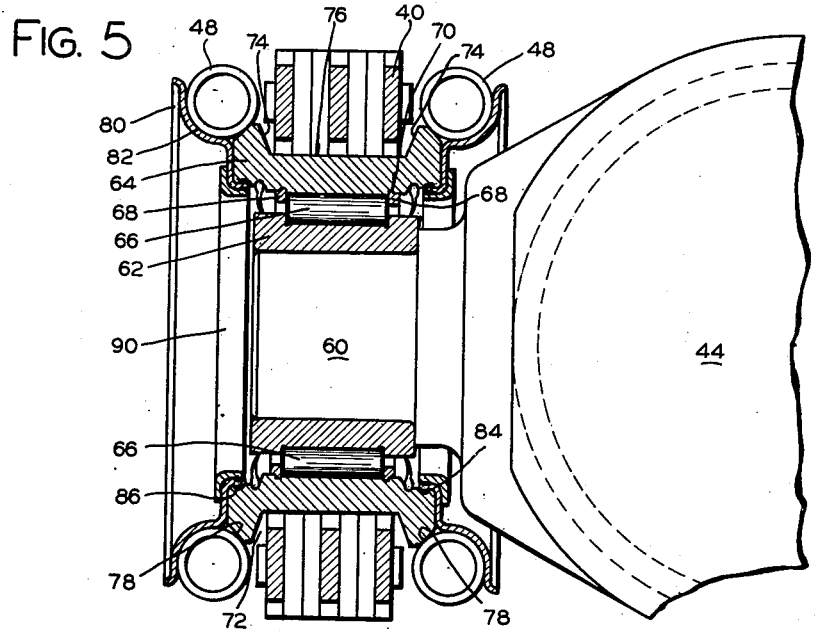

United States Patent Office 3,111,856
Patented Nov. 26, 1963

3,111,856
COMBINED GUIDE MEANS
Elmer R. Backofen, Battle Creek, Mich., assignor to Clark Equipment Company, a corporation of Michigan
Continuation of application Ser. No. 713,847, Feb. 7, 1958. This application Nov. 15, 1961, Ser. No. 153,258
7 Claims. (Cl. 74—230.3)

This invention relates to a combined guide means and sprocket or sheave and more particularly to a guide means for flexible elements, such as fluid hoses and the like, in combination with a rotatable wheel, such as a sprocket or sheave, over which a chain, cable or the like may be reeved. This application is a continuation of my now abandoned application Serial No. 713,847, filed February 7, 1958..

Frequently it is found desirable to reeve more than one flexible element on a wheel such as a sprocket, pulley or the like. Difficulties have been encountered heretofore in certain applications in which the wheel is movable both in rotation and linearly along some predefined path, such as is each sprocket wheel or sheave associated with the lift cylinder of upright masts of industrial lift trucks, and on which wheel is reeved more than one flexible element, such as a load lifting chain and an hydraulic hose.

In order to exemplify the problem heretofore encountered and to illustrate the significance of the present contribution to the solution of the problem, I shall herein refer to the invention as it applies to the industrial lift truck art, not by way of limitation but for the purpose of illustrating a particular application hereof.

As is well known in the industrial truck art, accessory or attachment devices often require that fluid under pressure be supplied to effect operation thereof. Such devices are normally mounted upon the lifting carriage or fork tines of the truck for the purpose of carrying out various specialized materials handling operations. These accessory devices frequently raise rather serious practical problems with regard to the manner in which pressurized fluid for the operation thereof can be expeditiously connected thereto without interferring with the operation of the truck and/or lifting mast. In many applications of accessory devices it has been found expedient to reeve flexible fluid conduits over elements connected on or adjacent to the upper movable end of the piston rod of the lift cylinder assembly. Different means have been tried heretofore in the industrial truck art to achieve a safe, inexpensive and reliable method of reeving hydraulic pressure hoses in the aforementioned manner.

It is an object of this invention to provide a wheel means over which may be reeved a plurality of flexible elements, and which is relatively low in cost of manufacture and simple to service and maintain.

It is a feature of this invention to provide a wheel means assembly for uses of the type contemplated on which may be reeved a plurality of flexible elements at equal radii from the axis of rotation of the wheel means.

An important object of this invention is to provide a wheel construction on which may be reeved a plurality of flexible elements and in which construction certain damageable parts are designed to be expendible at low cost.

In carrying out my invention I have provided a central pulley wheel or sprocket means which is mounted for rotation and over which may be reeved a flexible element such as a cable, chain or the like. Either detachably or non-detachably secured, as desired, adjacent either or both sides of the central wheel means is located a structural element which forms with the adjacent side of the wheel means a pocket in which a flexible element, such as a hose, cable, or the like, is adapted to be received.

The axis of movement of the latter flexible element is preferably at the same distance from the center of rotation of the wheel means as is the axis of movement of the former flexible member which is reeved over the center portion of the wheel means. Means are provided for securing the said structural element or elements to the central portion of the wheel means so that such elements may be readily detached therefrom and easily replaced in the event of damage thereto for any reason.

Other objects, features and advantages of this invention will appear from the following detailed description taken in conjunction with the accompanying drawings in which:

FIGURE 3 is an enlarged elevational front view of the device of my invention as applied to the movable portion of the upright lift cylinder assembly;

FIGURE 5 is a sectional view taken along line 5—5 of FIGURE 3.

Figure 1:
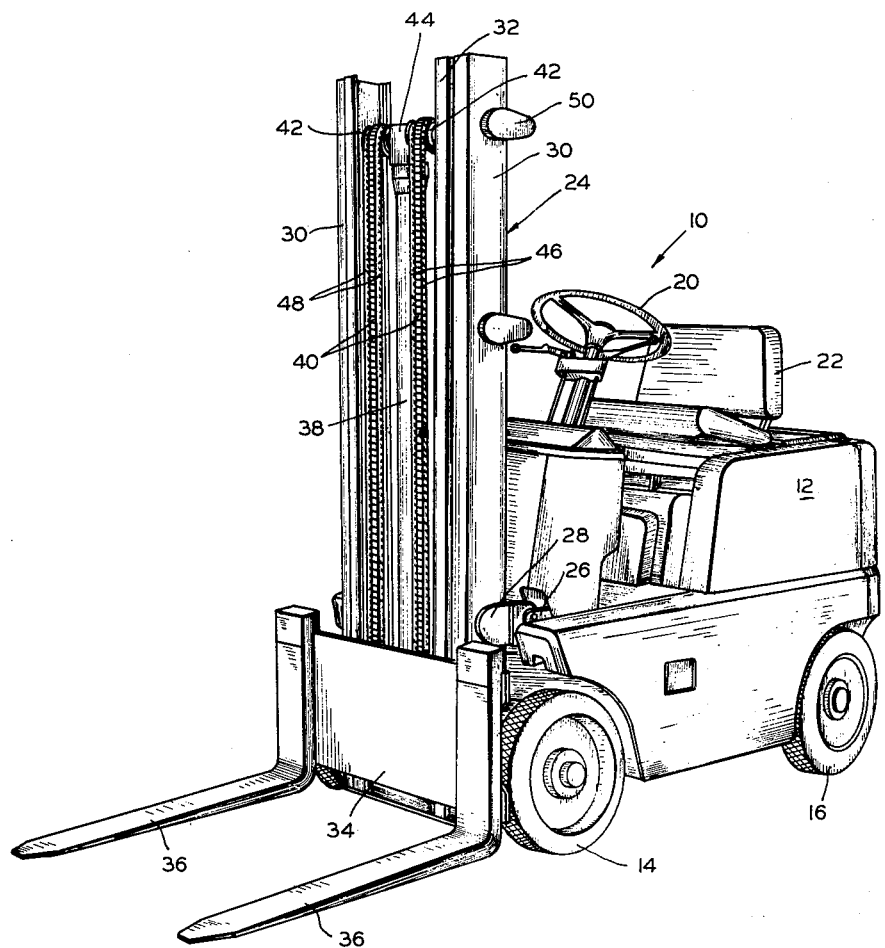
FIGURE 1 is a view in perspective of an industrial lift truck of well-known type to which the device of my invention has been applied.
Figure 2:
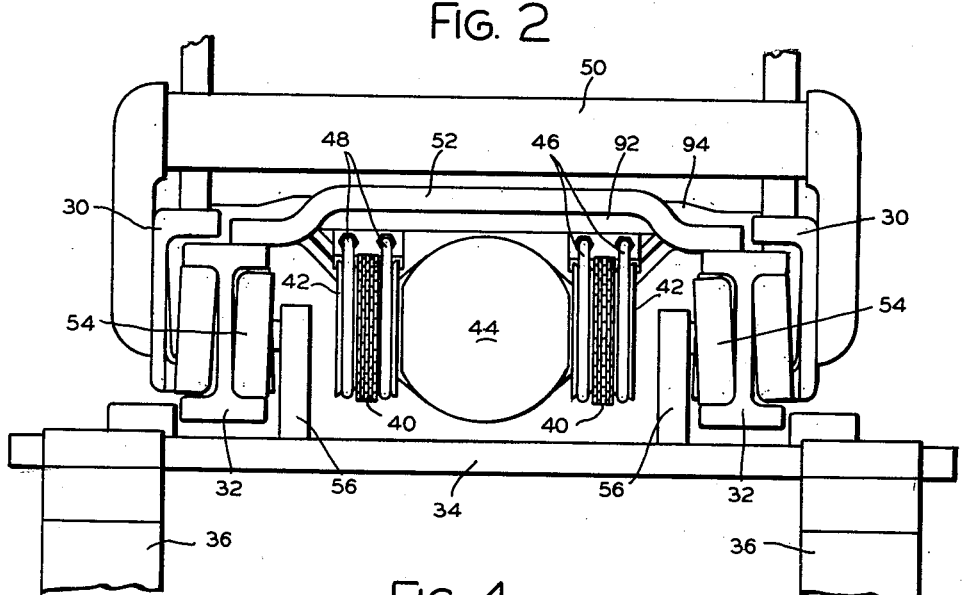
FIGURE 2 is an enlarged and somewhat schematized plan view of the lifting mast portion of FIGURE 1.

Referring now in detail to FIGURES 1 and 2, the numeral 10 indicates generally an industrial lift truck. This vehicle includes a body portion 12 which is mounted on four wheels in the usual manner. In the truck illustrated, the wheels 14 are drive wheels and are operated by prime mover means such as an internal combustion engine located within body portion 12. The rear wheels 16 (only one of which is visible) are dirigible wheels and are connected to an operator's steering wheel 20 by means of a conventional linkage for steering the vehicle. The operator's station, of which the steering wheel 20 is a part, includes also seat 22 and various controls for operating the vehicle, the lifting mast, and any accessory device which may be associated therewith.

At the front end of the body portion of the truck is located the vertically disposed telescopic mast structure 24. This mast is generally pivotally mounted at its lower end on the body portion of the truck and is arranged to be tilted forwardly and rearwardly by conventional means, including a link and bracket 26 and 28, connected between truck mounted hydraulic cylinder means (not shown) and the mast structure 24 at each side thereof. The mast structure 24 includes an outer guideway formed by a pair of channel members 30 and an inner slide structure formed by a pair of I-beam section members 32 which telescope within corresponding members of outer guide structure 30, 30.

A load supporting carriage 34 is arranged to move upwardly and downwardly on the inner slide structure 32, 32 by means of a plurality of rollers 54 which are connected to the carriage 34 by brackets 56. The load supporting carriage as illustrated herein is provided with a pair of forwardly projecting fork tines 36 which are adapted to engage beneath the load to be transported and raised. Such raising action is produced in a conventional manner by an hydraulic motor 38 comprising an outer cylinder and an inner piston which is arranged to raise and lower the load supporting carriage 34 and the fork tines 36 through a chain and sprocket mechanism to be described in detail hereinafter.

Chains which form a portion of this mechanism are indicated on the drawing by the numeral 40. The chains 40 are reeved over sprocket portions of the wheel means of this invention which are indicated generally at numeral 42, said wheel means being mounted in a manner to be described on an elevatable crosshead 44 of the hydraulic motor 38. A pair of hydraulic hoses 46 are reeved over the one wheel means 42 adjacent opposite sides of the one chain 40, and a pair of hoses 48 are reeved similarly over the other wheel means 42.

The pairs of hydraulic hoses 46 and 48 are adapted to supply hydraulic fluid under pressure to an attachment or accessory device, not shown, which may be mounted upon the fork tines 36 for vertical movement in the mast structure 24. The hoses are adapted to be connected to such an accessory device for the purpose of operating same to handle materials of certain types.

A transverse brace member 50 is connected across the outer guide structure 30, 30 for the purpose of strengthening the structure. Likewise, a brace member 52 extends between the inner slide structure 32, 32 for a similar purpose. Each of the chains 40 is adapted to be connected at its fixed end to the truck frame and at its movable end to the carriage 34 by anchor bolts, not shown, for lifting same in the inner slide structure 32, 32. The pairs of hydraulic hoses 46 and 48 may be connected to an accessory device on the fork tines, as aforesaid, in a well-known manner.

The truck structure per se is well known in the art and need not be amplified further herein. Such is described to provide a setting or environment in order to better illustrate one example of application of the device of this invention.

Figure 4:
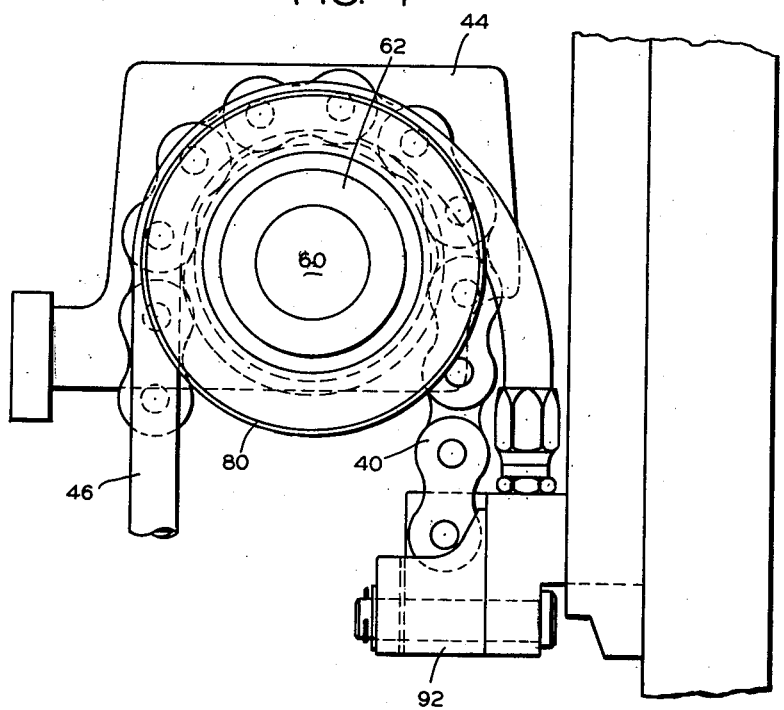
FIGURE 4 is a side elevational view of the construction shown in FIGURE 3, being somewhat reduced in size.

Referring now particularly to FIGURES 3, 4 and 5, the crosshead 44 of hydraulic motor 38 includes a cylindrical bearing arm 60 which extends outwardly from the crosshead at each side thereof. Each wheel 42 includes a roller bearing portion 62 which is adapted to be received upon and supported by the bearing arm 60. A hollow, essentially cylindrical central sprocket portion 64 is mounted upon a plurality of circumferentially spaced rotatable rollers 66 or roller bearing 62. A pair of laterally spaced ring members 68 are located on opposite sides of the annulus of rollers 66 and are secured to the inner peripheral portion of center portion 64 by means of a ridge 70 which registers in an annular slot of the center portion located immediately adjacent each side of the rollers 66. The roller bearings 62, 66, sheave or sprocket portion 64, and rings 68 form a unitary center wheel assembly.

The outer peripheral portion of center wheel section 64 is formed to provide an inner chain receiving pocket 72 formed of upwardly diverging and laterally spaced annular sides 74 which are connected by the annular surface 76 which, as illustrated, engages the link chain 40. Although the center portion 64 of the wheel is shown in the drawings as a sheave adapted to engage a link chain, it may of course take various other forms such as that of a sheave for a V-shaped friction belt, a sprocket having a ring of radially extending tooth portions for engaging chains and the like, or other forms of rotatable wheel which may be adapted to transmit a working force through a flexible member entrained thereon.

Each outer side of center portion 64 is formed to provide a downwardly sloping surface 78 which forms one side of a flexible member receiving pocket. A generally annular guide member 80 is formed to provide an annular cupped portion 82, the cross section of which has a radius substantially equal to the radius of a flexible cylindrical member, such as the hose illustrated, said cylindrical member being engageable in the cupped portion. The guide member 80 is preferably spun or stamped in manufacture to provide a low cost disposable item.

Each member 80 is formed inwardly of cup-shaped portion 82 to provide an inwardly extending annular flange portion 84 of such diameter that it is pressible into the open face portion of either side of the sheave portion 64. An annular groove 86 or equivalent is preferably formed in the inner periphery of each side face portion of the sheave member 64. An annular flange tool member 90 is adapted to engage inner portion 84 of member 80 between itself and central sheave portion 64 for the purpose of pressing, upon the application of an external force, the inner end of portion 84 into secure engagement with the side face portion of the central sheave. The groove 86 formed in each face portion of the central sheave aids in assuring a secure, relatively immovable relation between the sheave portion and members 80. This result is effected as the member 90, when it is pressed into position, tends to force the inner edge portion of member 80 into the groove 86, as shown.

As illustrated in the drawings, the pairs of hydraulic hoses 46 and 48 are reeved on each wheel in the pockets formed at the sides thereof between the central sheave portion and members 80. The central sheave and side portions of each wheel are preferably so formed for any particular application that the longitudinal axes of those portions of the chain and hose which engage in the pockets of the wheel are substantially equidistant from the axis of rotation of the wheel. A smooth flow of the flexible members engaged by the wheel is thereby assured during rotational and linear movement of the wheel with the hoist motor 38.

The one ends of hoses 46 are shown connected in FIGURE 4 to a junction block 92, which may in turn be connected by other hose means, not shown, to a source of pressure fluid. Junction block 92 may be connected to a cross-brace member 94 of the inner slide members 32, 32 of the mast structure so that the ends of the hoses connected to the junction block move vertically with movement of the inner slide members, whereas the opposite ends of said hoses move vertically with an accessory device as aforesaid.

During vertical movement in either direction of the hoist motor 38 it will be seen that scuffing action between the hoses and wheels is eliminated because of the wheel construction which both separates them and provides equal radial distances from the rotational axis of the wheel to the centers of the flexible members, as aforesaid.

The hose guide members 80 may be manufactured at an extremely low cost, and in the event damage thereto for any reason may be readily removed from the wheel assembly, disposed of, and replaced in the field with a minimum amount of "down time" of the vehicle. Likewise, member 90 is of such low cost that it may be disposed of if damage, and readily replaced in the field, with minimum loss of time and material.

The use of member 90 is optional. If desired, the guide members 80 may be secured to the side portions of sheave 64 as by welding. However, the use of the member 90 is the preferred construction because of the facility with which replacement of the guides 80 can be made.

From the above it will now be understood that my invention provides a guide and sheave wheel of relatively simple, low cost construction, and of readily replaceable parts, which is constructed to handle flexible members of various types with efficiency, while minimizing the chances of damage to the flexible members during operation of the unit in rotation and/or movement along a predefined linear path.

While I have described a particular embodiment of my invention for the purpose of illustration it should be understood that various modifications thereof may be made within the spirit of the invention as set forth in the claims.

I claim:

1. In combination, a first rotatable wheel element having a groove formed in the outer peripheral portion thereof and mountable upon a shaft member and adapted to reeve therein a flexible force transmitting member, a second rotatable wheel element detachably secured to at least one side portion of the first wheel element and forming with said one side portion a groove which is adapted to reeve therein a flexible conduit, the centers of those portions of said flexible member and conduit which engage in the grooves of said wheel elements being substantially equidistant from the axis of rotation of said wheel elements, an annular retainer member securing said second wheel element to the said one side portion of the first wheel element, and groove means in the inner periphery of the one side portion of said first wheel element, said retainer member forcing a portion of said second wheel element into said latter groove means in securing said second wheel element to the one side portion of the first wheel element.

2. A device as claimed in claim 1 wherein said second wheel element terminates at the inner periphery thereof in an inwardly turned annular flange which embraces an inner peripheral portion of the first wheel element and which is in turn embraced by said annular retainer member.

3. A device as claimed in claim 1 wherein a third rotatable wheel element substantially duplicates said second rotatable wheel element and is detachably secured to the other side portion of the first wheel element in forming with said other side portion a groove which is adapted to reeve therein a second flexible conduit, groove means in the inner periphery of said other side portion of the first wheel portion, and a second annular retainer member forcing a portion of said third wheel element into said latter groove means in securing said third wheel element to said other side portion of the first wheel element.

4. A device as claimed in claim 1 wherein said annular retainer member is operatively secured to said one side portion of the first wheel element for easy detachment therefrom and is of a disposable construction, said first wheel element being of a relatively permanent construction and adapted to receive successively a plurality of such detachable retainer members.

5. In combination, a first rotatable wheel element having a groove formed in the outer peripheral portion thereof and mountable upon a shaft member and adapted to reeve therein a flexible force transmitting member, a second rotatable wheel element detachably secured to at least one side portion of the first wheel element and forming with said one side portion a groove which is adapted to reeve therein a flexible conduit, an annular retainer member securing said second wheel element to the said one side portion of the first wheel element, and groove means in the inner periphery of the one side portion of said first wheel element, said retainer member forcing a portion of said second wheel element into said latter groove means in securing said second wheel element to the one side portion of the first wheel element.

6. In combination, a stub shaft member, revolvable bearing means mounted upon the shaft member, a first rotatable wheel element mounted upon said bearing means for rotation about the axis of the stub shaft and adapted to reeve a flexible force transmitting member in a groove formed in the outer peripheral portion thereof, a second rotatable wheel element detachably secured to one side portion of the first wheel element and having a generally cup-shaped annular portion which forms with said one side portion a groove which is adapted to reeve therein a flexible element, said second wheel element providing a detachable portion of the combination, an annular retainer member securing said second wheel element to the said one side portion of the first wheel element, and groove means in the inner periphery of the one side portion of said first wheel element, said retainer member forcing a portion of said second wheel element into said latter groove means in securing said second wheel element to the one side portion of the first wheel element.

7. In combination, a first rotatable wheel element having a groove formed in the outer peripheral portion thereof and mountable upon a shaft member and adapted to reeve therein a flexible force transmitting member, a second rotatable wheel element detachably secured to at least one side portion of the first wheel element and forming with said one side portion a groove which is adapted to reeve therein a flexible conduit, and an annular retainer member securing said second wheel element to the said one side portion of the first wheel element, said second wheel element terminating at the inner periphery thereof in an inwardly turned annular flange which embraces an inner peripheral portion of the first wheel element and which is in turn embraced, radially inwardly thereof by said annular retainer member in securing said second wheel element to the one side portion of the first wheel element.

References Cited in the file of this patent
UNITED STATES PATENTS

| | | |
|---|---|---|
| 1,783,993 | Aldeen | Dec. 9, 1930 |
| 2,709,371 | Hale | May 31, 1955 |
| 2,747,689 | Abbe | May 29, 1956 |
| 2,748,966 | Gohrke | June 5, 1956 |
| 2,791,293 | Schenkelberger | May 7, 1957 |
| 2,807,382 | Schenkelberger | Sept. 24, 1957 |